Patented Dec. 21, 1937

2,102,593

UNITED STATES PATENT OFFICE 2,102,593

AZO DYESTUFFS

Johann Heinrich Helberger, Cologne-Mülheim, and Otto Bayer, Leverkusen-I. G. Werk, Germany, assignors to General Aniline Works, Inc., New York, N. Y., a corporation of Delaware No Drawing. Application November 18, 1935, Serial No. 50,470. In Germany November 23, 1934

3 Claims. (Cl. 260—38.5)

The present invention relates to new azodyestuffs, more particularly it relates to azodyestuffs which may be represented by the general formula:

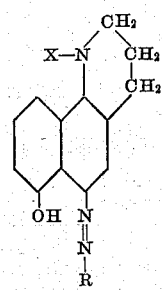

wherein X stands for hydrogen or alkyl which may bear substituents, and R stands for the radical of a diazotized aromatic diazotization component, such as a radical of the benzene or naphthalene series.

Our new dyestuffs are obtainable by coupling in an acid medium py-tetrahydro-7-hydroxynaphthopyridine of the formula:

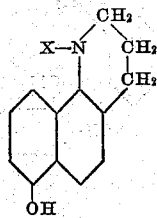

wherein X means the same as stated above, with aromatic diazo compounds.

Dyestuffs of especial technical interest are obtained when using diazotization components of the kind generally used in the manufacture of azodyestuffs which are intended to find application for dyeing and printing cellulose esters and ethers, especially cellulose acetate silk. Such diazotization components are for example aminobenzene compounds free from groups inducing solubility in water, such as the sulfonic acid or carboxylic acid group, but which may bear in the nucleus other substituents, such as the nitro group, an alkyl group an alkoxy group, the hydroxy group, and halogen. The cellulose acetate dyestuffs thus obtained generally yield clear blue to green shades of good fastness to light and of very good dischargeability.

Compared with similarly constituted dyestuffs those obtained in accordance with the present invention are distinguished by their clarity and by their shades, which are distinctly turned to the blue to green part of the spectrum, and it is remarkable that with the aid of certain bases, such as with p-nitranilines, dinitranilines and the like, there are obtainable shades which have been unknown up to the present in the series of monoazodyestuffs for acetate artificial silk. The new dyestuffs are technically valuable due to the clarity of their shades combined with the very good fastness to light and excellent dischargeability, and they fulfill a long felt want in the field of dischargeable dyestuffs for cellulose acetate.

The invention is illustrated by the following examples, but not restricted thereto:

Example 1

13.8 parts by weight of p-nitraniline are diazotized in the usual manner in aqueous hydrochloric acid with 6.9 parts by weight of sodium nitrite which have been dissolved in hot water. The diazo solution is then introduced into an aqueous mineral acid solution of 23.3 parts by weight of py-tetrahydro-7-hydroxynaphthopyridine hydrochloride; the coupling commences immediately and is complete after a short time. The dyestuff having the following formula:

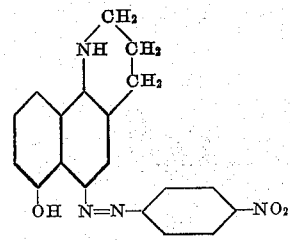

is isolated in the usual manner. It dyes acetate silk from a soap bath greenish-blue shades of good fastness to light and good dischargeability.

The py-tetrahydro-7-hydroxynaphthopyridine can be prepared in the following manner:

50 parts by weight of the sodium salt of -naphthopyridine-7-sulfonic acid (obtainable by reacting upon 1-naphthylamino-5-sulfonic acid with glycerin, nitrobenzene and sulfuric acid according to the method of Skraup) are hydrogenated at 140–180° C. in 300–400 parts by weight of water in the presence of a nickel catalyst with hydrogen under a pressure of 150 atmospheres. When hydrogen is no longer consumed the reaction mass is allowed to cool, the catalyst is separated, and the tetrahydronaphthopyridine sulfonic acid formed is precipitated by acidifying with hydrochloric acid and is filtered.

100 parts by weight of the tetrahydronaphthopyridine sulfonic acid are fused at 230–240° C. with 4 to 5 times the quantity of potassium hydroxide. After cooling, the melt is dissolved in water and neutralized with hydrochloric acid, whereupon the py-tetrahydro-7-hydroxynaphthopyridine probably of the formula:

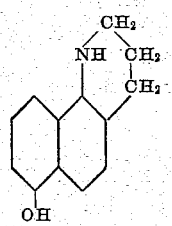

separates in the form of practically colorless crystals; its hydrochloride is rather difficultly soluble in water and crystallizes in the form of yellowish leaflets.

Example 2

16.8 parts by weight of 5-nitro-2-anisidine are stirred into 40 parts by weight of concentrated hydrochloric acid and 40 parts by weight of water, whereby the chlorohydrate is formed. Now there is diazotized with a concentrated aqueous solution of 6.9 parts by weight of sodium nitrite, small quantities of impurities are filtered off and the clear diazo solution is given into an aqueous solution of 23.5 parts by weight of py-tetrahydro-7-hydroxynaphthopyridine chlorohydrate. After shortly stirring the coupling is complete. The free mineral acid is neutralized with caustic soda lye and the dyestuff having the following formula:

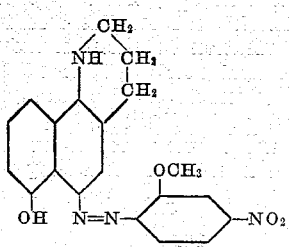

is isolated by filtration.

The product when dyed on artificial acetate silk from a soap bath yields clear light blue shades of good dischargeability.

Example 3

26.2 parts by weight of 2.4-dinitro-6-bromoaniline are diazotized in 100 parts by weight of concentrated sulfuric acid 60° Bé. with a quantity of nitrosylsulfuric acid corresponding to 6.9 parts by weight of sodium nitrite. The diazo solution obtained, which is strongly acid to sulfuric acid, is given into an aqueous solution of 23.5 parts by weight of py-tetrahydro-7-hydroxynaphthopyridine chlorohydrate. After the addition of the diazo solution coupling is finished. The dyestuff having in its free state the following formula:

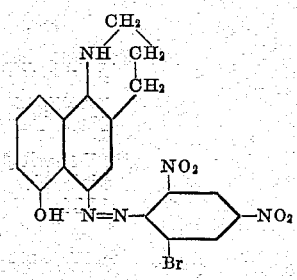

is isolated in the usual manner. It dyes on artificial acetate from a soap bath green shades of good fastness properties.

A dyestuff of similar properties is obtained by substituting the 2.4-dinitro-6-bromoaniline by the 2.4-dinitro-6-chloroaniline.

Example 4

15.4 parts by weight of 5-nitro-2-aminophenol are diazotized in a hydrochloric acid solution with an aqueous solution of 6.9 parts by weight of sodium nitrite. The suspension of the diazo compound is poured into an aqueous solution of 23.5 parts by weight of py-tetrahydro-7-hydroxynaphthopyridine chlorohydrate. After stirring for 12 hours the coupling is complete, and the dyestuff isolated having in its free state the following formula:

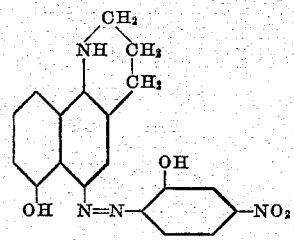

is isolated by filtration. It gives, when dyed on acetate artificial silk in the usual manner, a clear greenish blue of good dischargeability.

When coupling py-tetrahydro-1-ethyl-(or -1-hydroxyethyl) - 7 - hydroxynaphthopyridine with diazotized p-nitraniline, there are obtained dyestuffs of the formulae:

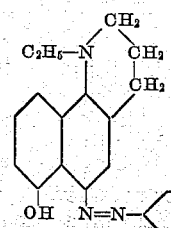 or 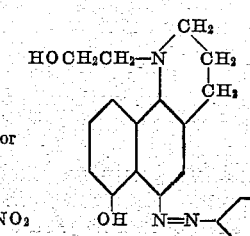

respectively, dyeing cellulose acetate silk from a soap bath bluish-grey shades.

When coupling the same coupling components with diazotized 1-amino-2-chloro-4-nitrobenzene, there are obtained dyestuffs dyeing cellulose acetate silk bluish-green shades.

The py-tetrahydro-1-ethyl-(or -1-hydroxyethyl-) 7-hydroxynaphthopyridine are obtained by reacting upon py-tetrahydro-7-naphthopyridine with ethyl chloride or chloroethyl alcohol, respectively, in the presence of chalk.

We claim:

1. Azodyestuffs of the general formula:

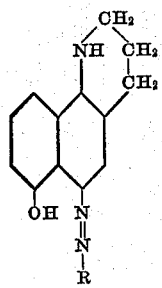

wherein R stands for a member selected from the group consisting of an aromatic radical of the benzene and naphthalene series.

2. The dyestuff of the following formula:

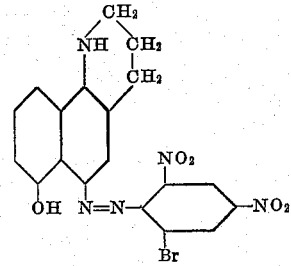

dyeing cellulose acetate silk green shades.

3. The dyestuff of the general formula:

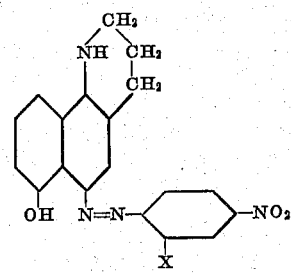

wherein X stands for a hydrogen, alkoxy or the nitro group, dyeing cellulose acetate silk generally clear blue to green shades.

JOHANN HEINRICH HELBERGER.
OTTO BAYER.